United States Patent

Kidokoro et al.

[11] Patent Number: 5,885,185
[45] Date of Patent: Mar. 23, 1999

[54] TOROIDAL TYPE CONTINUOUSLY VARIABLE TRANSMISSION

[75] Inventors: Hitoshi Kidokoro, Yokohama; Itsuro Muramoto, Yokosuka; Masahiro Tsukamoto, Yokohama, all of Japan

[73] Assignee: Nissan Motor Co., Ltd., Yokohama, Japan

[21] Appl. No.: 928,432

[22] Filed: Sep. 12, 1997

[30] Foreign Application Priority Data

Sep. 13, 1996 [JP] Japan ............................. 8-243458

[51] Int. Cl.⁶ ........................................ F16H 15/38
[52] U.S. Cl. .................................. 476/10; 476/42
[58] Field of Search .................... 74/10, 40, 42

[56] References Cited

U.S. PATENT DOCUMENTS 4,744,032  5/1988  Miyaura et al. ............... 476/10 X
5,542,890  8/1996  Nakano et al. ................. 476/10

FOREIGN PATENT DOCUMENTS 3-089066  4/1991  Japan .

OTHER PUBLICATIONS

Nakano et al., "Dynamic Characteristics of Speed Ratio Control of the Halt Toroidal CVT for Passanger Cars", SAE Technical Paper Series No. 901761, 25–32 (1990).

Primary Examiner—Allan D. Herrman
Attorney, Agent, or Firm—Foley & Lardner

[57] ABSTRACT

A first and a second power roller supported by trunnions are gripped between an input disc and an output disc disposed on an identical rotation axis. The gyration angles of the power rollers are varied by driving the trunnions in a direction perpendicular to the rotation axis by an oil pressure actuator. The oil pressure of the actuator is controlled based on a target gyration angle, and the gyration angle of the first power roller is fed back to the oil pressure control. Vibration of the first power roller due to external disturbance is prevented from affecting the second power roller via oil pressure control by making a force according to a displacement of the first power roller in the direction perpendicular to the rotation axis, act only on the trunnion supporting the first power roller.

14 Claims, 17 Drawing Sheets

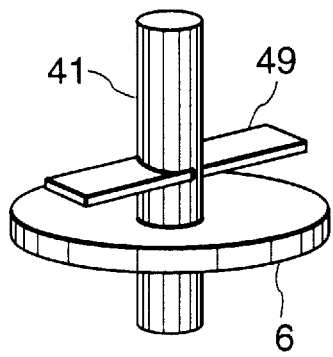
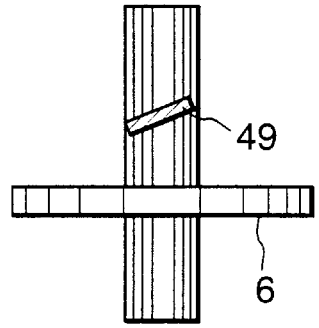
FIG.12A  FIG.12B
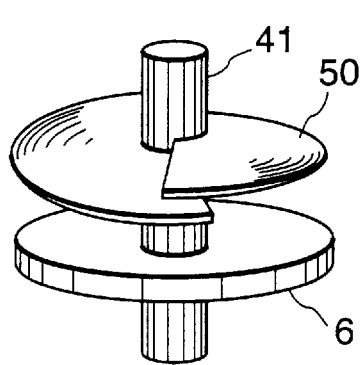
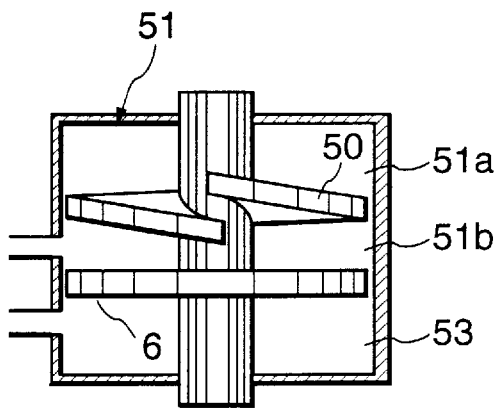
FIG.13A  FIG.13B

TOROIDAL TYPE CONTINUOUSLY VARIABLE TRANSMISSION

FIELD OF THE INVENTION

This invention relates to prevention of vibration in a toroidal type continuously variable transmission.

BACKGROUND OF THE INVENTION

In a toroidal type continuously variable transmission for a vehicle as disclosed for example in U.S. Pat. No. 5,542,890, a speed change ratio varies according to a gyration angle of a plurality of power rollers gripped between an input disc and an output disc. These power rollers are each supported by a trunnion.

The gyration angle of the power roller varies when a force in a specified direction at right angles to both the power roller rotation axis and the disc rotation axis, acts upon the trunnion.

This variation depends on a load applied by the input disc and output disc to the power roller due to a displacement of the power roller in the aforementioned specified direction. The dynamics of this gyration angle variation is explained for example in SAE Technical Paper NO. 901761.

In such a transmission, when an external force in the specified direction acts on one of the power rollers due to an unexpected disturbance, the gyration angle of the power roller varies as a result.

When the gyration angle changes, the transmission torque of this power roller varies, and the force exerted by the input and output discs on the power roller also varies. In this way, torque is transmitted from the input disc to the output disc at a new balance point when the force due to the external disturbance, the force applied by the input and output discs to the power roller depending on the transmitted torque and the oil pressure supporting the power roller via the trunnion, are in equilibrium.

In a power roller control mechanism, e.g. as disclosed in Tokkai Hei 3-89066 published by the Japanese Patent Office in 1991, a plurality of power rollers are supported by an identical oil pressure controlled by a control valve. A gyration angle and offset amount of a specific power roller is fed back to the control valve via a precess cam which responds to both of these parameters.

The reason why the offset amount of the rotation axis is fed back in addition to the gyration angle in this way, is because if only the gyration angle were fed back, hunting of the controlled oil pressure would easily occur.

The purpose of this feedback control is to maintain the gyration angles of all the power rollers identical. However when the above specified power roller is displaced in the offset direction due to an external disturbance, it also affects the oil pressure supporting other power rollers not subject to the effect of the disturbance, because oil pressure control of all the power rollers is performed based on the offset amount of the specified power roller.

As a result, synchronous operation of the power rollers may collapse, and this may lead to vibration of the power rollers.

SUMMARY OF THE INVENTION

It is therefore an object of this invention to suppress vibration of a plurality of power rollers, and to ensure that the power rollers gyrate in synchronism with one another.

In order to achieve the above object, this invention provides a toroidal type continuously variable transmission comprising a first power roller and second power roller gripped between an input disc and output disc disposed on an identical rotation axis. Each of these power rollers is supported by a trunnion so as to be free to gyrate and gyration angles of the power rollers are varied by driving the trunnions in a direction perpendicular to the rotation axis by a common drive force provided by an actuator. The transmission further comprising a mechanism for controlling the drive force such that the gyration angles are equal to a predetermined target gyration angle, a first feedback member for feeding back the gyration angle of the first power roller to a control of the drive force by the control mechanism, and a second feedback member for exerting a force depending on a displacement of the first power roller in a perpendicular direction to the rotation axis, on only the trunnion supporting the first power roller.

It is preferable that the second feedback member comprises a spring.

It is also preferable that the second feedback member comprises a combination of magnets.

It is also preferable that the second feedback member comprises an elastic resin.

It is also preferable that the transmission further comprises a third feedback member which exerts a force depending on a displacement of the second power roller in a perpendicular direction to the rotation axis, on only the trunnion supporting the second power roller.

It is also preferable that the transmission further comprises a mechanism for controlling the drive force such that the gyration angles are equal to a predetermined target gyration angle, a feedback member for feeding back the gyration angle and a displacement of the first power roller in a perpendicular direction to the rotation axis, to a control of the drive force by the control mechanism, and a feedback member for feeding back a force depending on a displacement of the second power roller in the perpendicular direction to the rotation axis, to only the trunnion supporting the second power roller.

This invention also provides a toroidal type continuously variable transmission comprising a first power roller and second power roller gripped between an input disc and output disc disposed on an identical rotation axis, a first trunnion supporting the first power roller so as to be free to gyrate, a first drive device for varying a gyration angle of the first power roller by driving the first trunnion in a perpendicular direction to the rotation axis, a second trunnion supporting the second power roller so as to be free to gyrate, and a second drive device for varying a gyration angle of the second power roller by driving the second trunnion in the perpendicular direction to the rotation axis. The transmission further comprises a first control mechanism for controlling a drive force of the first drive device such that a gyration angle of the first power roller is equal to a target gyration angle, a feedback member for feeding back the gyration angle and a displacement of the first power roller in a direction perpendicular to the rotation axis, to a control of the drive force by the first control mechanism, a second control mechanism for controlling a drive force of the second drive device to the target gyration angle, and a feedback member for feeding back the gyration angle of the first power roller to a control of the drive force by the second control mechanism.

This invention also provides a toroidal type continuously variable transmission comprising a first power roller and second power roller gripped between an input disc and output disc disposed on an identical rotation axis, a first trunnion supporting the first power roller so as to be free to gyrate, and a second trunnion supporting the second power roller so as to be free to gyrate. The transmission further comprises a first oil chamber for varying a gyration angle of the first power roller by exerting an oil pressure on the first trunnion in a perpendicular direction to the rotation axis, a second oil chamber for varying a gyration angle of the second power roller by exerting an oil pressure on the second trunnion in a perpendicular direction to the rotation axis, a mechanism for controlling the oil pressure of the first and second oil chambers such that the gyration angles of the power rollers are equal to a predetermined target gyration angle, a member for feeding back the gyration angle of the first power roller to a control of the oil pressure by the control mechanism, and a member exerting a propelling force on the first trunnion according to a variation rate of the gyration angle of the first power roller by rotating inside the first oil chamber together with the first trunnion.

This invention also provides a toroidal type continuously variable transmission comprising a first power roller and second power roller gripped between an input disc and output disc disposed on an identical rotation axis. Each of the power rollers is supported by a trunnion so as to be free to gyrate, and gyration angles of the power rollers are varied by driving the trunnions in a direction perpendicular to the rotation axis by a common drive force provided by an actuator. The transmission further comprises a mechanism for controlling the drive force such that the gyration angles are equal to a predetermined target gyration angle, the mechanism comprising a first feedback member for feeding back the gyration angle of the first power roller to a control of the drive force, a sensor for detecting a rotation speed of the input disc, a sensor for detecting a rotation speed of the output disc, and a control circuit configured to calculate a speed change ratio of the transmission from the rotation speeds of the input disc and output disc, calculate an average gyration angle of the power rollers from the speed change ratio, estimate an average value of a displacement amount in a direction perpendicular to the rotation axis of the trunnions from the variation of the average gyration angle, and feed back the average value to the control of the drive force by the control mechanism.

It is preferable that the control mechanism further comprises a second member for feeding back the gyration angle and the displacement of the first power roller in the direction perpendicular to the rotation axis, to the control of the drive force and a mechanism for changing over between feedback by the first member and feedback by the second member according to an operating state of the control circuit.

This invention also provides a toroidal type continuously variable transmission comprising a first power roller and second power roller gripped between an input disc and output disc disposed on an identical rotation axis. Each of the power rollers is supported by a trunnion so as to be free to gyrate, and gyration angles of the power rollers are varied by driving the trunnions in a direction perpendicular to the rotation axis by a common drive force provided by an actuator. The transmission further comprises a mechanism for controlling the drive force such that the gyration angles are equal to a predetermined target gyration angle. This mechanism comprising a first feedback member for feeding back the gyration angle of the first power roller to a control of the drive force by the control mechanism, The transmission further comprises a sensor for detecting a displacement of the first power roller in the perpendicular direction to the rotation axis, and a control circuit configured to eliminate predetermined high frequency components from an output signal of the sensor, and feed back the output signal from which high frequency components have been removed, to the control of the drive force by the control mechanism.

It is preferable that the control mechanism further comprises a second member for feeding back the gyration angle and the displacement of the first power roller in the direction perpendicular to the rotation axis, to control of the drive force by the control mechanism and a mechanism for changing over between feedback by the first member and feedback by the second member according to an operating state of the control circuit.

This invention also provides a toroidal type continuously variable transmission comprising a first power roller and second power roller gripped between an input disc and output disc disposed on an identical rotation axis. Each of the power rollers are supported by a trunnion so as to be free to gyrate, and the trunnions are connected with each other by a link and wherein gyration angles of the power rollers are varied by driving the trunnions in a direction perpendicular to the rotation axis by a common drive force provided by an actuator. The transmission further comprises a mechanism for controlling the drive force such that the gyration angles are equal to a predetermined target gyration angle, a first feedback member for feeding back the gyration angle of the first power roller to a control of the drive force by the control mechanism, and a feedback member for exerting a force opposing a displacement of the link accompanying the displacement of the first and second power rollers in a direction perpendicular to the rotation axis, on the link.

This invention also provides a toroidal type continuously variable transmission comprising a first power roller and second power roller gripped between an input disc and output disc disposed on an identical rotation axis. Each of the power rollers is supported by a trunnion so as to be free to gyrate, and gyration angles of the power rollers are varied by driving the trunnions in a direction perpendicular to the rotation axis by a common drive force provided by an actuator. The transmission further comprises a sensor for detecting a rotation speed of the input disc, a sensor for detecting a rotation speed of the output disc, and a control circuit configured to calculate a speed change ratio of the transmission from the rotation speeds of the input disc and output disc, calculate an average gyration angle of the power rollers from the speed change ratio, estimate an average value of a displacement amount of the trunnions in the direction perpendicular to the rotation axis from a variation of the average gyration angle, and feed back the average value and the average gyration angle to a control of the driving force by the control mechanism.

The details as well as other features and advantages of this invention are set forth in the remainder of the specification and are shown in the accompanying drawings.

BRIEF DESCRIPTION OF THE DRAWINGS

FIGS. 12A and 12B are a perspective view and a side view of a fin and piston according to an eighth embodiment of this invention.

FIGS. 13A and 13B are a perspective view and a side view of a screw and piston according to a ninth embodiment of this invention.

DESCRIPTION OF THE PREFERRED EMBODIMENTS

A first embodiment of this invention will now be described with reference to FIGS. 1–5B of the drawings.

Figure 1:
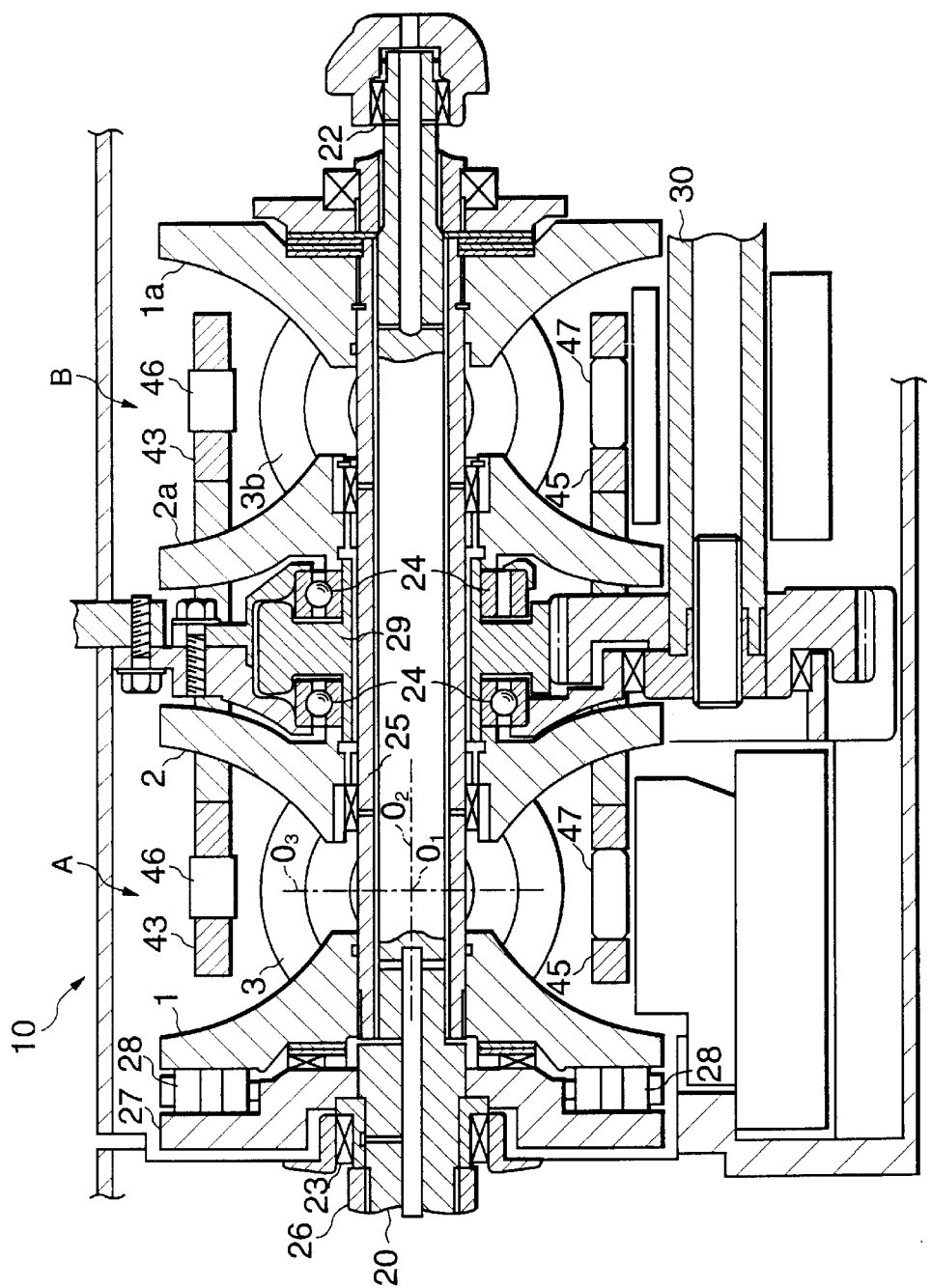
FIG. 1 is a longitudinal sectional view of a toroidal type continuously variable transmission according to a first embodiment of this invention.

First, referring to FIG. 1, a double cavity toroidal type continuously variable transmission 10 comprises two speed change units. One of the speed change units A comprises an input disc 1, an output disc 2, and a pair of power rollers 3 and 3a which are gripped between these discs 1 and 2. The other speed change unit B comprises an input disc 1a, an output disc 2a and a pair of power rollers 3b and 3c which are gripped between these discs. The power roller 3c is however not shown in the drawings.

An input axis 20 is connected to an engine, not shown, and is supported free to rotate by bearings 22 and 23 provided in a casing 21, as shown in FIG. 1. The input axis 20 comprises a hollow shaft 25. The input discs 1 and 1a are joined to the two ends of the hollow shaft 25.

The output discs 2, 2a and an output gear 29 are supported free to rotate in the central part of the hollow shaft 25.

The output discs 2, 2a are connected to the output gear 29.

The output gear 29 is supported in the case 21 by a bearing 24 so that it is free to rotate relative to the input shaft 20 and hollow shaft 25. A needle bearing is interposed between the output discs 2, 2a and the hollow shaft 25.

The aforesaid power rollers 3, 3a and 3b, 3c are gripped between the toroidal curved surfaces of the input disc 1 and output disc 2, and input disc 1a and output disc 2a, which are coaxially disposed on the hollow shaft 25.

A cam disc 27 is connected to the input axis 20. A loading cam 28 is interposed between the cam disc 27 and rear surface of the input disc 1. The displacement of the cam disc 27 in the axial direction is regulated by a loading nut 26 which screws onto the end of the input axis 20. The loading cam 28 generates a thrust-load in the axial direction of the input axis 20 according to the relative revolution of the cam disc 27 and input disc 1. The power rollers 3, 3a are thereby gripped between the input disc 1 and output disc 2, the power rollers 3b, 3c are gripped between the input disc 1a and output disc 2a, and the rotation of the input shaft 20 is transmitted to the output shaft 30 via the output gear 29.

As the construction of the speed change units A and B is identical, the following description will given only for the speed change unit A.

Figure 2:
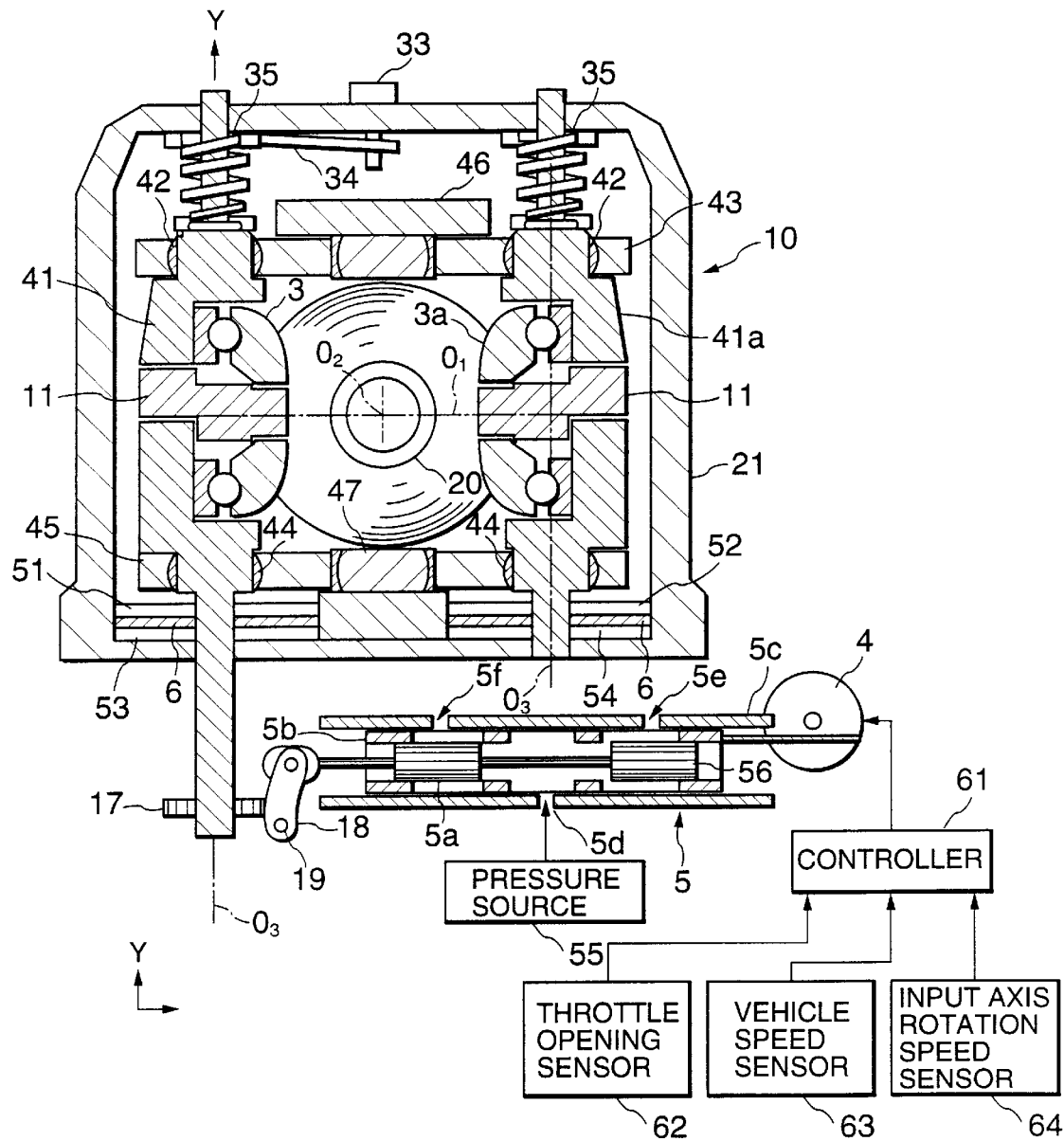
FIG. 2 is a transverse cross-sectional view containing a block diagram of a control system of the toroidal type continuously variable transmission.

The power rollers 3, 3a are respectively supported free to rotate by a pair of trunnions 41, 41a as shown in FIG. 2.

The power roller 3 corresponds to the first power roller of the claims, and the power roller 3a corresponds to the second power roller of the claims.

The trunnion 41 is supported free to rotate and to swing on an upper link 43 via a spherical surface coupling 42 provided at its upper end. Similarly, the bottom end of the trunnion 41 is also supported free to rotate and to swing on a lower link 45 via a spherical surface coupling 44. The trunnion 41a is also connected to the upper link 43 and lower link 45.

The upper link 43 and lower link 45 are supported free to swing in the casing 21 by spherical surface couplings 46, 47.

Pistons 6, 6a are fixed to the trunnions 41, 41a.

Piston chambers 51, 53 are formed above and below the piston 6, while piston chambers 52, 54 are formed above and below the piston 6a.

Oil pressure is supplied to these piston chambers 51–54 via a control valve 5 so as to drive the pistons 6, 6a in mutually opposite directions in the direction of the y axis. The control valve 5 corresponds to the controlling mechanism mentioned in the claims.

The control valve 5 comprises a sleeve 5b driven in the axial direction by a stepping motor 4, and a spool 5a which can be displaced in an axial direction inside the sleeve 5b, which are housed in the housing 5c.

An input port 5d connected to a pressure source 55, and output ports 5e and 5f are formed in the housing 5c.

The output port 5e is connected to the piston chambers 51, 54, and the output port 5f is connected to the piston chambers 52, 53.

Figure 3:
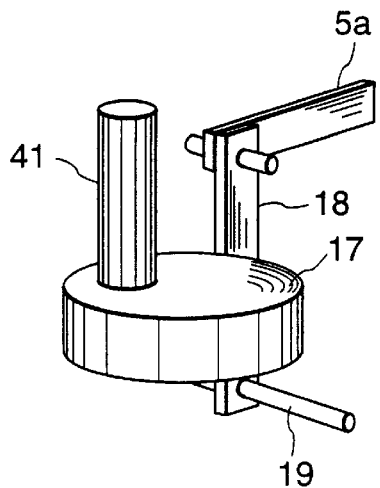
FIG. 3 is a perspective view of a cam and link which feed back a gyration angle of a power roller in the toroidal type continuously variable transmission.

As shown in FIG. 3, the spool 5a comes in contact with the cam 17 fixed to the lower end of the trunnion 41 via the link 18.

The cam 17 and link 18 constitute the first feedback member in the claims. The spool 5a is displaced in an axial direction inside the shaft sleeve 5b according to the gyration angle of the power roller 3 through the cam 17 and link 18.

The link 18 is supported free to swing via an axis 19 connected to its lower end.

The upper end of the link 18 is connected to one end of the spool 5a, and its intermediate part slides on the cam 17.

Due to this construction, when the trunnion 41 rotates about the center axis $O_3$ according to the gyration angle of the power roller 3, the rotary motion is transmitted to the spool 5a via the cam 17 and link 18.

A rack is joined to the right-hand end of the sleeve 5b shown in FIG. 2. This rack engages with a pinion of the stepping motor 4. The stepping motor 4 displaces the sleeve 5b in the axial direction according to a speed change command value u (number of steps) corresponding to the target speed change ratio set by the controller 61.

The connection states of the output ports 5e, 5f and of the input port 5d are varied according to the axial displacement of the sleeve 5b with respect to the spool 5a.

This speed change command value u is determined by the controller 61 based on input signals from a throttle opening sensor 62 which detects an opening of an engine throttle, a vehicle speed sensor 63 which detects a vehicle speed, and a rotation sensor 64 which detects a rotation speed of an input shaft of the transmission or the engine rotation speed. The determination of the speed change command value u by this controller 61 is known from, for example, the aforesaid Tokkai Hei 3-89066.

When the stepping motor 4 causes a relative displacement of the sleeve 5b and the spool 5a according to the speed change command value u output from the control unit 61, oil pressure from a pressure source 55 is for example supplied to piston chambers 52, 53, and piston chambers 51 and 54 are connected to a drain.

When the stepping motor 4 causes a relative displacement of the spool 5a and sleeve 5b in the reverse direction, oil pressure from the pressure source 55 is supplied to the piston chambers 51, 54, and the piston chambers 52, 53 are connected to the drain.

In both cases, the trunnions 41, 41a are driven in mutually opposite directions along the y direction of FIG. 2.

Due to the displacement of the trunnions 41, 41a in the y axis direction, the power rollers 3, 3a are offset in mutually opposite directions along the y axis from a neutral state wherein the rotation axis of the power rollers 3, 3a and the center axis of the input shaft 20 intersect in the same plane. Because of this offset, the input disc 1 and output disc 2 exert a force in the gyration direction on the power rollers 3, 3a so that the rollers oscillate about the axis $O_3$ as center, and the speed change ratio therefore varies.

The variation of this gyration angle θa is mechanically fed back to the spool 5a of the speed change control valve 5 via the cam 17 and link 18 provided at the lower end of one of the trunnions 41.

When the stepping motor 4 reaches the speed change command value u, the feedback mechanism returns the spool 5a to its initial neutral position relative to the sleeve 5b. As a result, the power rollers 3, 3a maintain new gyration angles, and the axis $O_1$ returns to the state wherein it intersects the axis $O_2$ in one plane.

Herein, the first feedback member feeds back only the gyration angles θa of the power rollers. The cam 17 also displaces in the axial direction due to the axial displacement of the trunnion 41, however the effect of this displacement on the displacement amount of the link 18 is so small compared to the displacement amount of the link 18 due to the rotational displacement of the cam 17, that it may be ignored.

Also, according to this invention, an offset amount y in the $O_3$ direction of the power rollers 3, 3a, i.e. the y axis direction, is fed back as a pressure variation.

In order to do this, a spring 35 is interposed between the trunnions 41 and the casing 21 above the upper link 43. The two ends of the spring 35 are joined to the trunnions 41 and the casing 21, and the spring 35 acts as a compression or extension spring which exerts a resistance to displacement in either direction from the neutral position of the trunnions 41. Herein, the term "neutral position" means the position wherein the rotation axis $O_1$ of the power roller 3 intersects with the axis $O_2$ of the input shaft 20.

When the trunnion 41 is displaced from the neutral position in the y axis direction of FIG. 2, the spring 35 pushes the trunnion 41 towards the neutral position in opposition to the displacement of the trunnion 41. This pushing force varies according to the offset amount y from the neutral position of the trunnion 41. The neutral position of the spring 35 wherein the spring 35 exerts no force on the trunnion 41 is adjusted by an adjusting plate 34 and adjuster 33 so that the neutral position of the spring 35 is identical to that of the trunnion 41.

The force of the spring 35 acts on the trunnion 41 as a feedback relative to the displacement in the y axis direction from the neutral position of the trunnion 41 due to the oil pressure.

It should be noted that the cam 17 and link 18 are provided only for the speed change unit A. The spring 35 is provided for each of the power rollers 3–3c.

As the facing rollers 3, 3a move symmetrically relative to the axis $O_2$, the adjuster 33 is adjusted so that the spring forces acting on the trunnions 41, 41a in the symmetrical position are both equal to zero. For this purpose, the adjuster 33 may be provided for either the trunnion 41 or the trunnion 41a. In the case of the speed change unit B too, the adjuster 33 may be provided for only one of the trunnions.

As described hereabove, therefore, the offset amount in the y axis direction from the neutral position of the trunnion 41 can be obtained as a reaction in the direction of the neutral position due to the spring 35 which pushes or pulls the trunnion 41 towards the neutral position.

The spring 35 supporting the trunnion 41 corresponds to a second feedback member in the claims, and the spring 35 supporting the trunnion 41a or the trunnion of the speed change unit B corresponds to a third feedback member in the claims.

Also, as the feedback mechanism comprising the cam 17 and link 18 transmits only the gyration angle of the power roller 3 to the speed change control valve 5, the gyrational motions of the power roller 3a which does not have a feedback mechanism for the gyration angle θa and of the power rollers 3b, 3c of the speed change unit B may be fully synchronized through the oil pressure control by the control valve 5.

In this transmission, the oil pressure supply system is common to the pistons 6 which perform speed change control, so the gyration angles of the power rollers 3, 3a, 3b and 3c are basically always the same. Also even when one power roller is displaced in the y axis direction due to an external disturbance, this displacement is not fed back to the oil pressure control, so the disturbance is not transmitted to the other power rollers. Therefore, the synchronism between the gyrational motions of the power rollers does not collapse due to the external disturbance, the power rollers do not cause vibration, and stable speed change control is performed.

Figure 4:
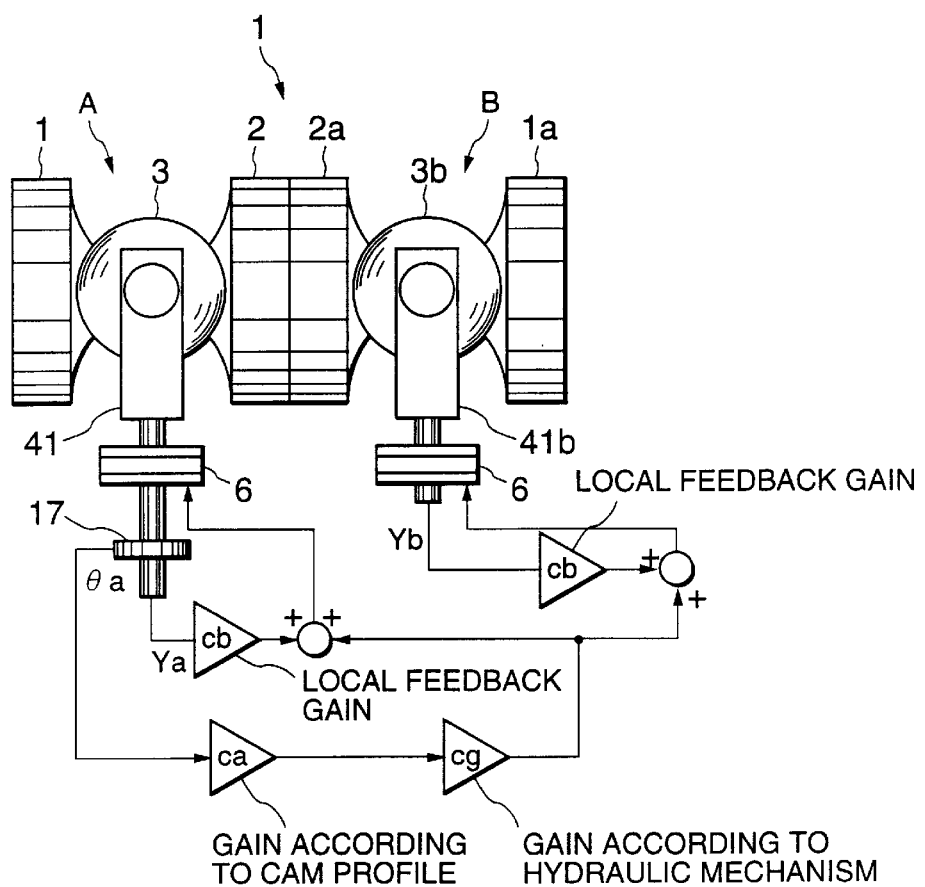
FIG. 4 is a block diagram graphically expressing speed change control of the continuously variable transmission.
Figure 5:
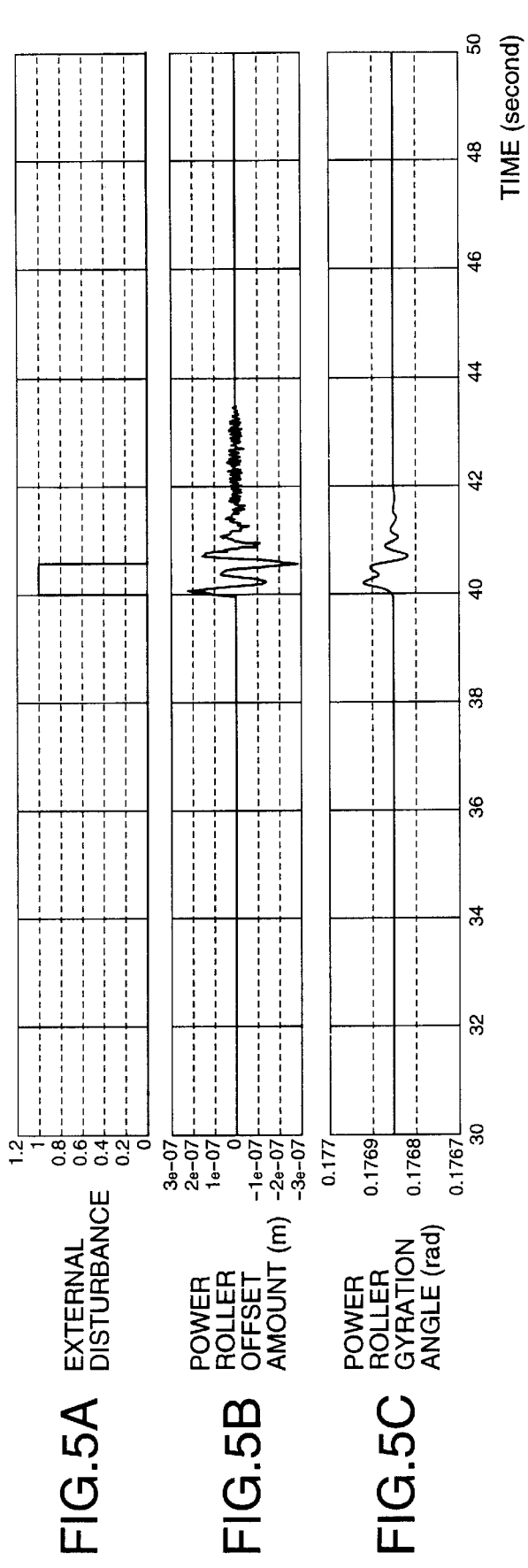
FIGS. 5A–5C are diagrams showing gyration angle and y axis displacement of a power roller when an external disturbance acts on it.

FIG. 4 schematically shows a feedback system of the toroidal type continuous variable transmission according to the above construction. In this figure, of the four power rollers 3–3c, only the trunnion 41 which supports the power roller 3 has a feedback mechanism comprising the cam 17 for a gyration angle θa. On the other hand, the power rollers 3–3c have separate feedback mechanisms comprising the springs 35 for the y axis offset amounts such as Ya and Yb.

In other words, the feedback mechanism for the gyration angle θa and the feedback mechanisms for the y axis offset amounts Ya, Yb are independent of each other, only the feedback amount of gyration angle to the oil pressure control being common to all power rollers. In the aforesaid prior art example Tokkai Hei 3-89066, both the gyration angle and offset amount of a specified power roller were fed back to the trunnion supporting force of all the power rollers via the oil pressure mechanism. Further, a gain Cg of the oil pressure mechanism was applied also to feedback of the offset amount to gyration angle control.

However, in this transmission, the offset amount is fed back only by applying a gain Cb based on the spring load of the spring 35 as a resistance to displacement from the neutral position of the trunnion 41 without the intervention of the oil pressure mechanism, i.e. without applying the gain Cg of the oil pressure mechanism.

FIGS. 5A–5C show simulation results for this transmission.

In this simulation, the offset amount feedback mechanism acts in such a direction as to suppress vibration of the power rollers with respect to an external disturbance shown in FIG. 5A.

According to this embodiment, the spring 35 was provided for all of the power rollers 3, 3a–3c as a feedback mechanism for the offset amount of the trunnions 41 in the y axis direction. However, vibration of the power rollers due to an external disturbance may also be suppressed to a limited extent by a feedback mechanism wherein the spring 35 is provided for at least one of the power rollers. In other words, as for example in a second embodiment of this invention shown in FIG. 6, even when the spring 35 is provided only for the trunnion 41 which feeds back the gyration angle of the power roller 3, the effect of variation of offset amount of the power roller 3 due to an external disturbance can be prevented from affecting control of the other power rollers.

Figure 7:
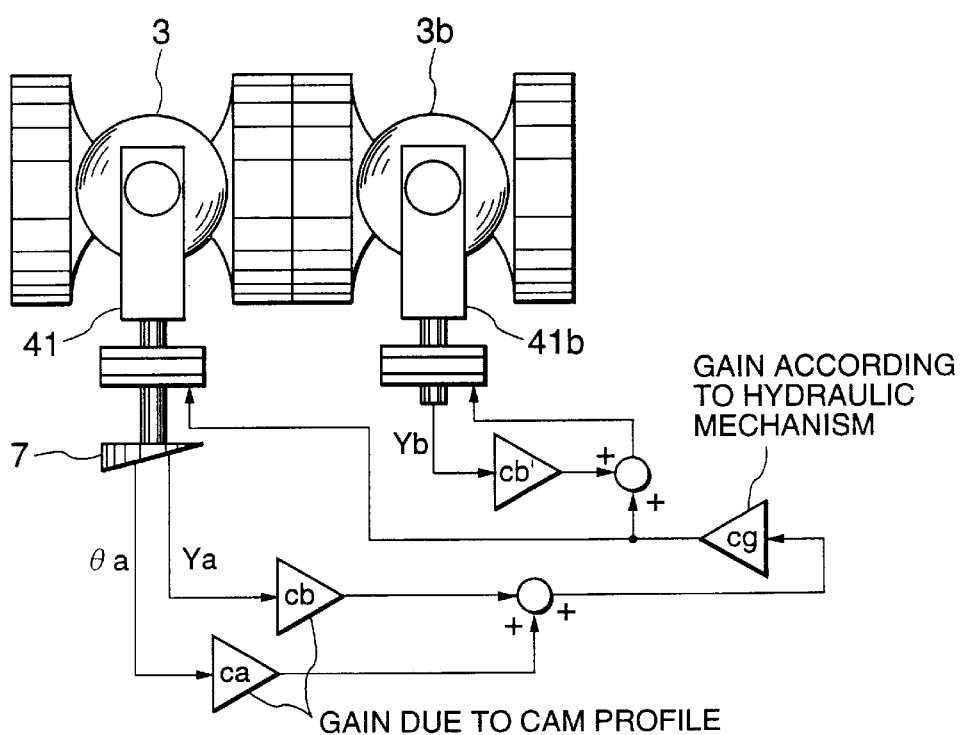
FIG. 7 is similar to FIG. 6, but showing a third embodiment of this invention.

Alternatively, as in a third embodiment of this invention shown in FIG. 7, a gyration angle θa of the power roller 3 and the offset amount Ya in the y axis direction are fed back to the oil pressure control via a precess cam 7 and link mechanism 8 as in the aforesaid prior art example Tokkai Hei 3-89066, while another feedback mechanism is provided by the spring 35 for the power roller 3b. In this case also, an external disturbance acting on the power roller 3 is prevented from being transmitted to the power roller 3b, and vibration of the power roller 3b is suppressed.

Figure 8:
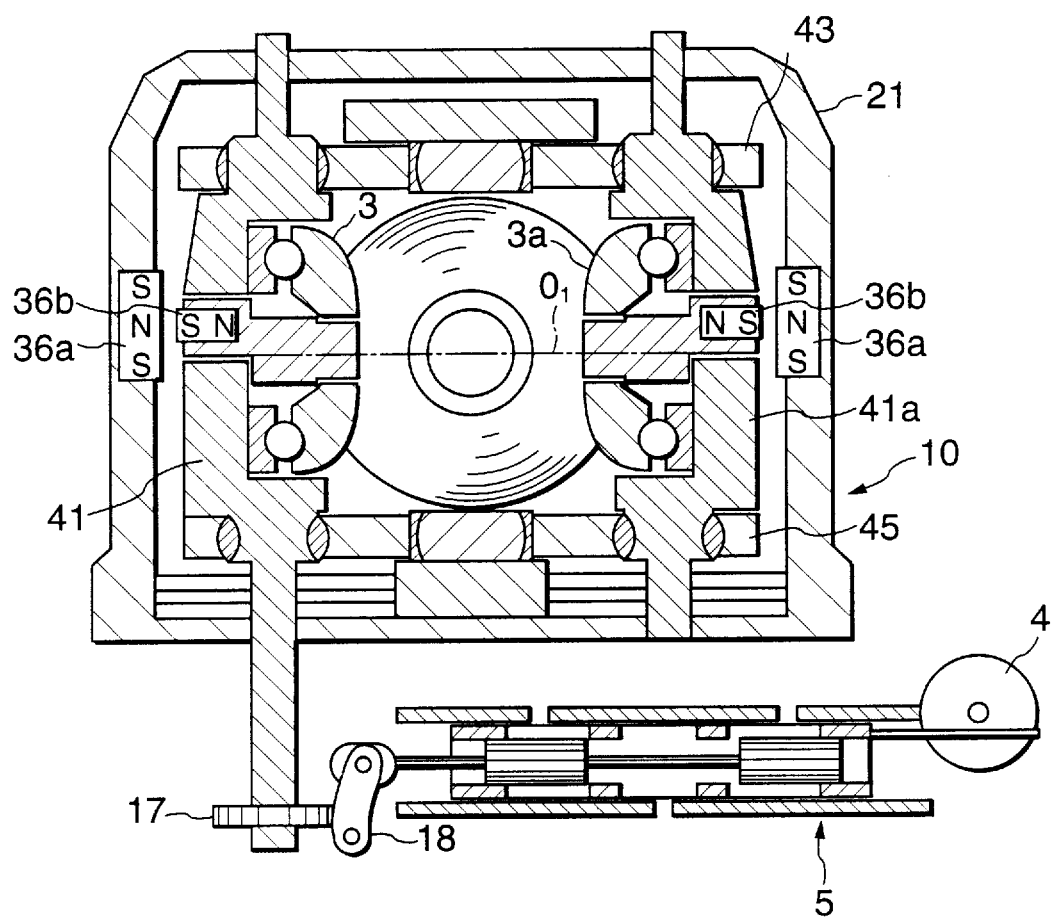
FIG. 8 is a transverse cross-sectional view of a toroidal type continuously variable transmission according to a fourth embodiment of this invention.

FIG. 8 shows a fourth embodiment of this invention. Herein, instead of the spring 35 of the aforesaid first embodiment, magnets 36a, 36b are provided which respectively pull the trunnions 41, 41a towards their neutral positions. The remainder of the construction is the same as that of the aforesaid first embodiment.

The magnet 36b has a S pole attached to the end of an eccentric axis 11 passing through the trunnion 41(41a), and facing the casing 21.

The magnet 36a is symmetrically attached with respect to the magnet 36b in the neutral position of the power rollers 3, 3a on the inner circumference of the casing 21. This magnet 36a has a N pole in its mid-portion and S poles at its upper and lower ends. These magnets are so arranged that in the neutral positions of the power rollers 3, 3a, the N pole of the magnet 36a and the S poles of the magnet 36b are symmetrical.

Also according to this embodiment, when the trunnion 41(41a) is displaced from its neutral position, the trunnion 41(41a) is pulled towards its neutral position by the attractive forces of the magnets 36a, 36b, and a force resisting the oil pressure acting on the piston 6 is generated so as to perform feedback corresponding to the offset amount in the y axis direction of the power rollers 3, 3a. In the neutral position of the power roller 3(3a), the magnets 36a, 36b do not exert any force in the y axis direction on the trunnion 41(41a), so there is no need to adjust the initial load as in the case when the spring 35 is used. In this case also, an effect is obtained to a limited extent if the combination of the magnets 36a, 36b is provided not for all the trunnions 41(41a), but for only one trunnion.

Figure 9:
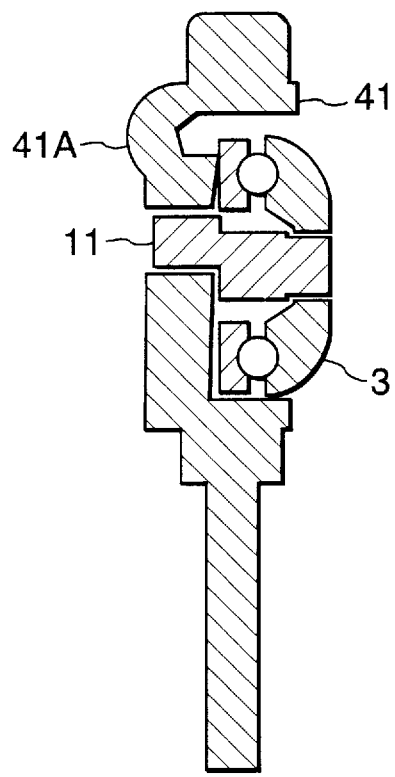
FIG. 9 is a transverse cross-sectional view of a trunnion and power roller according to a fifth embodiment of this invention.

FIG. 9 shows a fifth embodiment of this invention.

Herein, instead of the spring 35 of the aforesaid first embodiment, a part of the trunnion 41(41a) is formed of an elastic member 41A made for example of elastic resin.

The elastic member 41A bends above the eccentric axis 11 in FIG. 9. The upper end of the elastic member 41A is directly joined to the casing 21. According to this embodiment there is no upper link, and the pair of trunnions 41a, 41b are joined only by a lower link. When the trunnion 41 supporting the eccentric axis 11 displaces in the y axis direction from the neutral position according to the oil pressure acting on the piston 6, the bent elastic member 41A exerts a resilient force on the eccentric axis 11 towards a predetermined neutral position, so local feedback in the y axis direction is performed correctly despite the simple construction.

Figure 10:
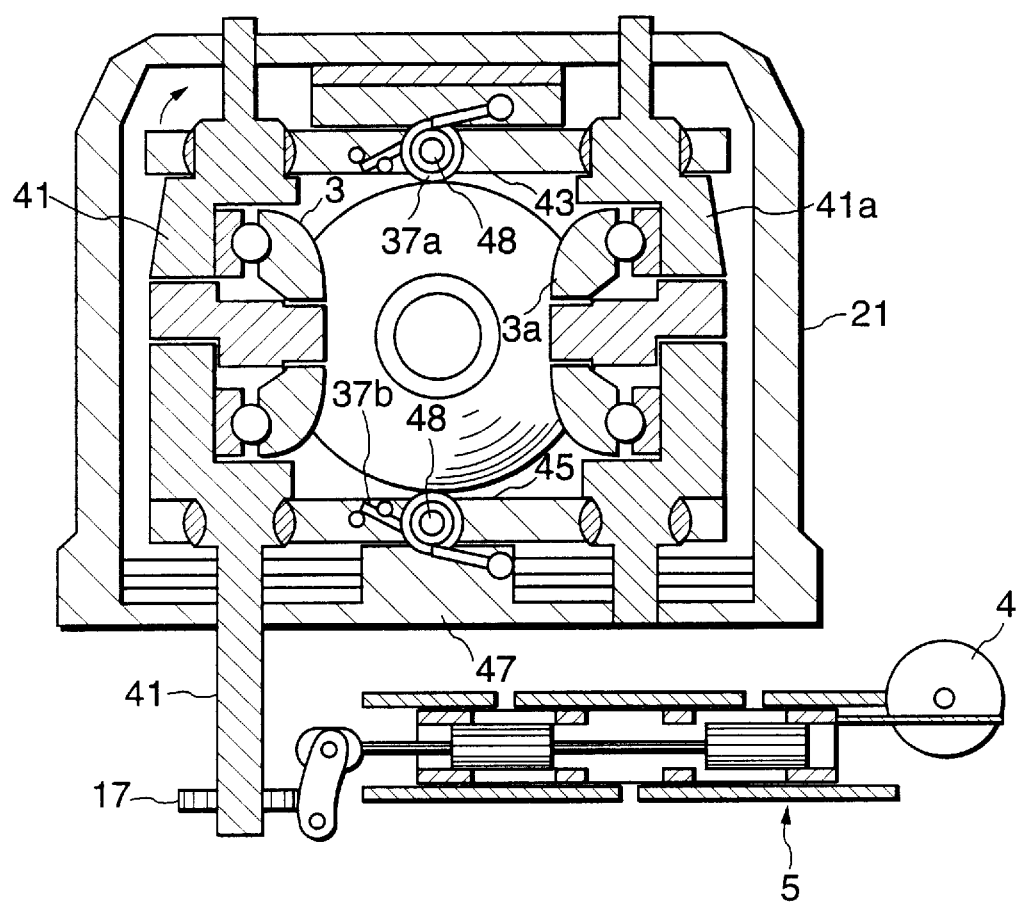
FIG. 10 is a transverse cross-sectional view of a toroidal type continuously variable transmission according to a sixth embodiment of this invention.

FIG. 10 shows a sixth embodiment of this invention. According to this embodiment, instead of the spring 35 of the aforesaid first embodiment, coil springs 37a, 37b are provided which push the upper link 43 and lower link 45 towards the neutral position. The remainder of the construction is identical to that of the aforesaid first embodiment.

The upper link 43 and lower link 45 are respectively supported free to pivot about a pin 48 fixed to the casing 21. An end of the coil spring 37a is joined to the upper link 43, while the other end is joined to the casing 21.

The upper link 43 is thereby pushed in the clockwise direction in FIG. 10.

Similarly, an end of the coil spring 37b is joined to the lower link 45 while the other end is joined to the casing 21.

The lower link 45 is thereby pushed in the anticlockwise direction in the figure.

In this way, the trunnions 41, 41a, which support the power rollers 3, 3a, are pushed in the y axis direction towards a predetermined neutral position in the y axis direction, and the coil springs 37a, 37b perform local feedback of the displacement in the y axis direction as in the case of the aforesaid other embodiments. Use of the coil springs 37a, 37b suppresses increase of the dimensions of the casing 21 in the y axis direction, and promotes greater compactness of the toroidal transmission.

Figure 11:
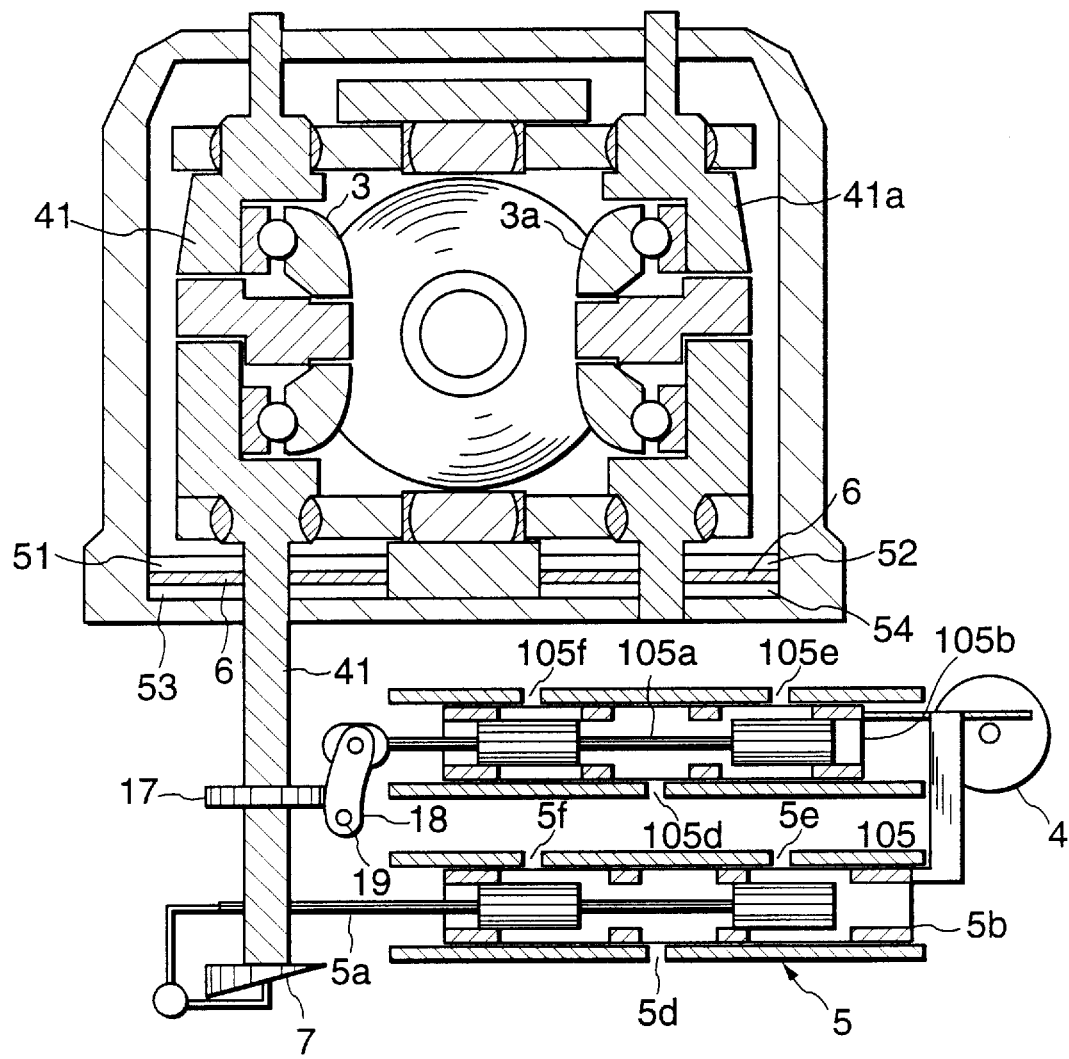
FIG. 11 is a transverse cross-sectional view of a toroidal type continuously variable transmission according to a seventh embodiment of this invention.

FIG. 11 shows a seventh embodiment of this invention.

According to this embodiment, the transmission is provided with a second control valve 105 in addition to the control valve 5 of the aforesaid prior art example.

The control valve 5 comprises a spool 5a which is driven according to the displacement in the y axis direction and the gyration angle f of the power roller 3 via the precess cam 7, and a sleeve 5b driven by the stepping motor 4, as in the aforesaid prior art example. The output ports 5e, 5f are respectively connected to the piston chambers 51, 53 which drive the trunnion 41 supporting the power roller 3.

The second control valve 105 comprises a spool 105a which is driven according only to the gyration angle f of the power roller 3 via a cam 17, and a sleeve 105b driven in synchronism with the sleeve 5b by the stepping motor 4, similarly to the control valve 5 of the aforesaid first embodiment. Output ports 105e, 105f are respectively connected to the piston chambers 52, 54 which drive the trunnion 41a supporting the power roller 3a.

Figure 6:
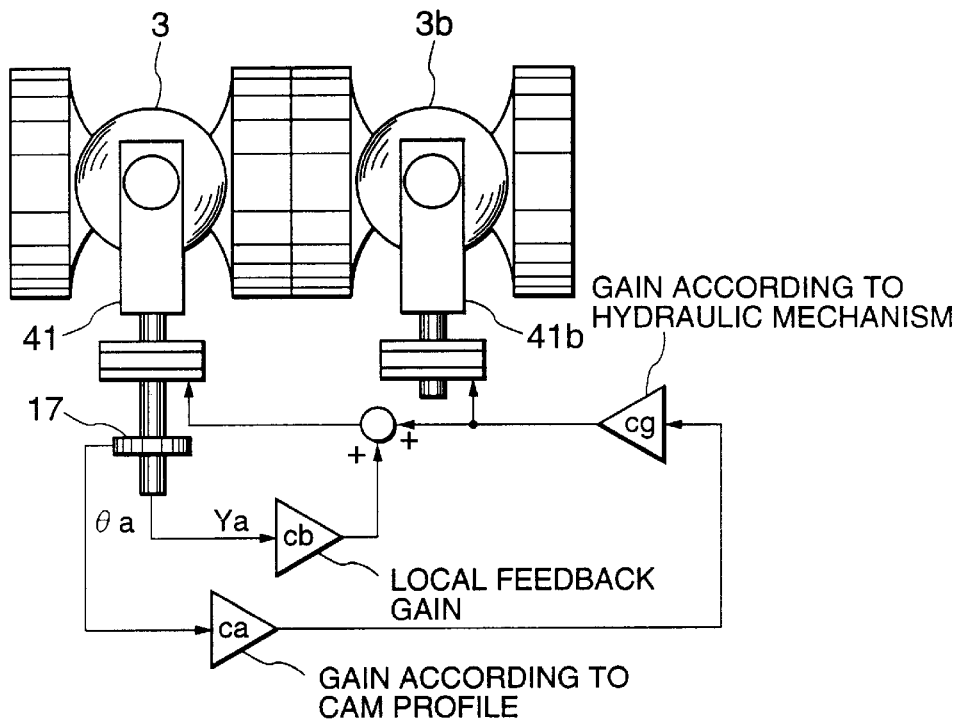
FIG. 6 is a block diagram graphically showing speed change control of a continuously variable transmission according to a second embodiment of this invention.

The gyration angle f and the offset amount in the y axis direction are fed back to only the power roller 3 via the control valve 5. Regarding the power roller 3a, only the gyration angle f is fed back via the speed change control valve 105. Due to the aforesaid construction, the feedback loop shown in FIG. 6 is obtained. Hence the feedback of the offset amount y in the y axis direction of the power roller 3 is fed back only to the oil pressure on the side of the power roller 3, and vibration due to an external disturbance is suppressed as in the case of the aforesaid first embodiment because the offset amount y is not fed back to the oil pressure on the side of the power roller 3a.

FIGS. 12A and 12B show an eighth embodiment of this invention.

According to this embodiment, instead of the spring 35 of the aforesaid first embodiment, a fin 49 is attached which generates a propelling force according to the rotation of the trunnion 41. This fin 49 is housed in the piston chamber 51 or the piston chamber 53. The remainder of the construction is the same as that of the aforesaid first embodiment. The fin 49 is the propulsion member mentioned in the claims. Also, the piston chamber 51(53) housing the fin 49 corresponds to the first oil chamber of the claims.

It is known that the differential of the gyration angle θa, i.e. the gyration rate, is directly proportional to the offset amount of the trunnion 41 in the y axis direction. For example, the reason why the aforesaid prior art example 3-89066 feeds back the rotational displacement of the trunnion and the offset amount in the y axis direction of the trunnion to the oil pressure control using a precess cam, is in order to feed back the gyration angle and gyration rate of the power roller to the oil pressure control.

The fin 49 which rotates together with the trunnion 41 in the piston chamber 51 or 53, causes a propelling force in the y axis direction to affect the trunnion 41 according to the rotation speed of the trunnion 41, i.e. according to the gyration rate of the power roller 3.

Therefore, the same effect is obtained from the fin 49 as from the spring 35 which feeds back the offset amount of the trunnion 41 in the aforesaid first embodiment.

In this case also, the feedback of offset amount is not applied to control of oil pressure supporting all the power rollers, but is applied as a force in the y axis direction only to the trunnion 41 to which the fin 49 is attached.

Therefore when the trunnion 41 displaces in the y axis direction or vibrates due to an external disturbance, the force in the y axis direction exerted by the fin 49 on the trunnion 41 suppresses its displacement or vibration, and the displacement or vibration of the trunnion 41 is not fed back to oil pressure control. Consequently, according also to this embodiment, the behavior of a specific power roller due to an external disturbance does not lead to unwanted vibration of the other power rollers.

According to this embodiment, the fin 49 exerts a force on the trunnion 41 in the y axis direction according to the rotation speed of the trunnion 41, i.e. the gyration rate of the power roller, and when the trunnion 41 has stopped, the fin 49 does not exert a force in the axial direction on the trunnion 41. An adjusting mechanism such as the adjusting plate 34 or adjuster 33 that was needed when the spring 35 is used, is therefore unnecessary.

FIGS. 13A, 13B show a ninth embodiment of this invention.

Herein, instead of the fin 49 of the aforesaid eighth embodiment, a screw 50 is attached to the trunnion 41 and housed in the piston chamber 51. The screw 50 partitions the piston chamber 51 into upper and lower chambers 51a, 51b, and working oil is circulated between the oil chambers 51a, 51b according to the rotation of the piston 6. For example, when the trunnion 41 rotates in a specific direction according to speed change operations of the transmission, the screw 50 causes the working oil to flow into the oil chamber 51a from the oil chamber 51b so as to increase the oil pressure of the chamber 51a, and this exerts a force in the y axis direction of the trunnion 41. When the piston rotates in the opposite direction, working oil flows from the oil chamber 51a to the oil chamber 51b so as to exert a force on the trunnion 41 in the opposite direction. Therefore according also to this construction, vibration of the power rollers due to external disturbances is suppressed, and the transmission of vibration to other power rollers can be prevented. The screw 50 may alternatively be housed in the piston chamber 53.

Figure 14:
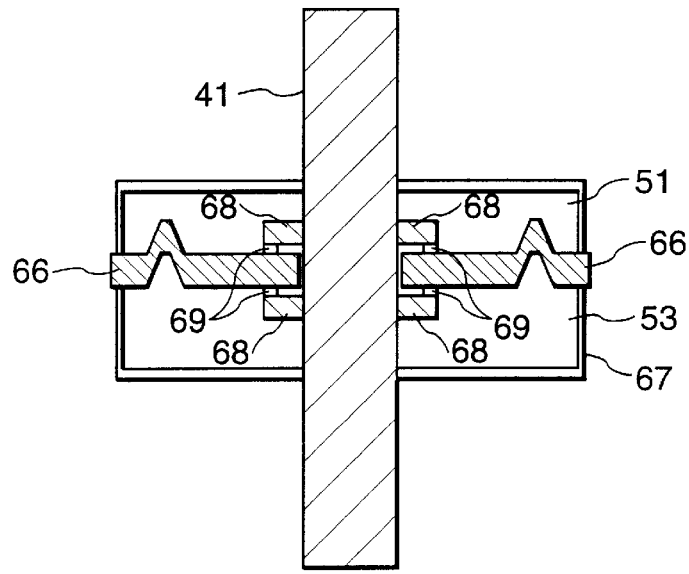
FIG. 14 is a longitudinal sectional view of a piston according to a tenth embodiment of this invention.

FIG. 14 shows a tenth embodiment of this invention.

According to this embodiment, instead of the piston 6 and the spring 35, a diaphragm-type elastic deformable piston 66 is used. The remainder of the construction is identical to that of the aforesaid first embodiment.

The outer circumference of the piston 66 which partitions the piston chambers 51 and 53 is fixed to a side wall 67 of the piston chamber. Due to a supporting member 68 fixed to the rotation axis of the trunnion 41, the inner circumference of the piston 66 is free to rotate about the axis and is supported such that displacement in the y axis direction is resisted.

A seal member 69 for preventing working oil from leaking between the piston chambers 51 and 53, is disposed between the supporting member 68 and piston 66.

When the trunnion 41 displaces in the axial direction, the piston 66 deforms, and the elastic resistance due to the deformation acts as a force restoring the trunnion 41 to its neutral position. In other words, the offset in the y axis direction from the neutral position of the trunnion 41 is fed back to the trunnion 41 as a force which restores it to the neutral position. Therefore, according also to this construction, vibration due to an external disturbance is suppressed and transmission of vibration to other power rollers is prevented.

According to this embodiment, as the outer circumference of the piston 66 is fixed to the side wall 67, the seal member 69 which prevents working oil from leaking is disposed near the rotation axis of the trunnion 41. As a result, the seal member 69 is shorter, and leaks of working oil between the oil chambers 51, 53 of the seal member are reduced.

Figure 15:
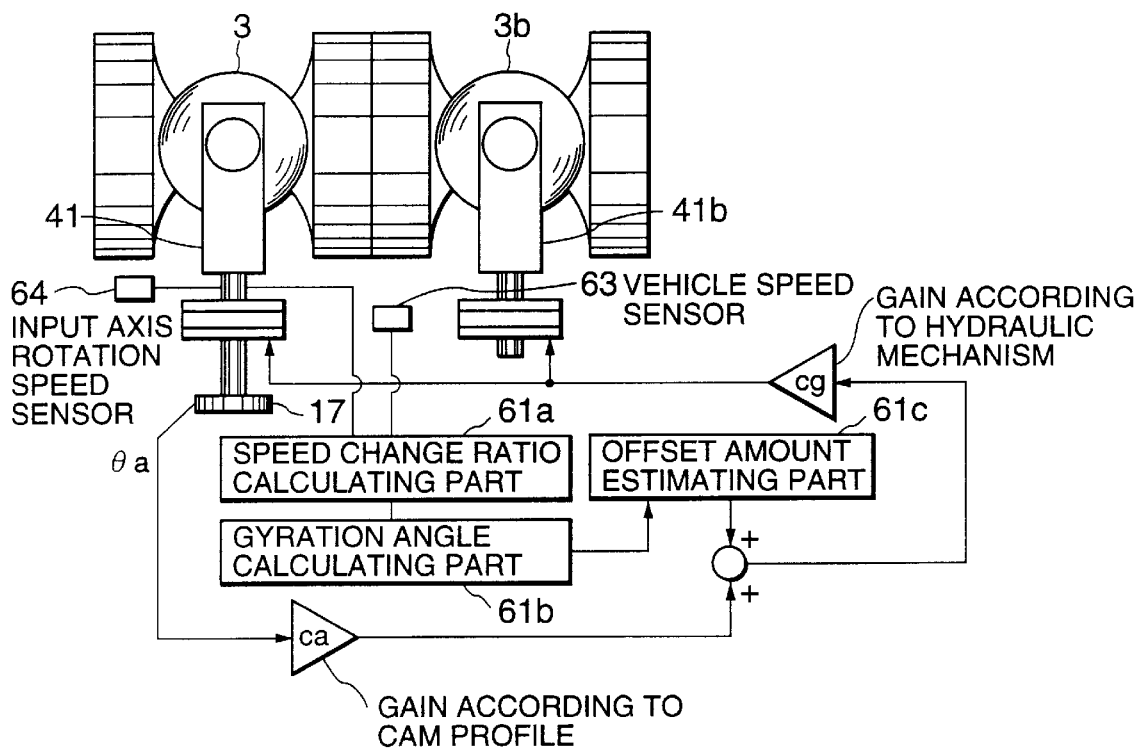
FIG. 15 is a block diagram graphically expressing speed change control according to an eleventh embodiment of this invention.

FIG. 15 shows an eleventh embodiment of this invention.

According to this embodiment, the controller 61 of the first embodiment is provided with a speed change calculating unit 61a, a gyration angle calculating unit 61b and a y axis displacement estimating unit 61c.

In this construction, the offset amount in the y axis direction of the trunnion 541 is estimated, and the command value u based on the estimated value is sent to the stepping motor 4.

The speed change calculating unit 61a computes a target speed change ratio from a preset map based on a throttle opening TVO input from the throttle opening sensor 62, a vehicle speed VSP input from the vehicle speed sensor 63, and a rotation speed Ni of the input shaft of the continuously variable transmission 10 input from the rotation sensor 64.

The gyration angle calculating unit 61b computes an average gyration angle of all the power rollers according to the target speed change ratio.

The y axis displacement estimating unit 61c estimates an average offset amount in the y axis direction of the power rollers 3, 3a–3c from the gyration angle calculated by the gyration angle calculating unit 61b, and outputs the command value u to the stepping motor 4 such that the real speed change ratio is the target speed change ratio.

The gyration angle calculated by the gyration angle calculating unit 61b is based on the real speed change ratio found from the vehicle speed VSP and input shaft rotation speed Ni, and is the average value of gyration angle for all the power rollers. The offset amount in the y axis direction estimated from this gyration angle is therefore also an average value for all power rollers.

The variation of the gyration angle θa is mechanically fed back to the spool 5a of the control valve 5 via the cam 17 and link 18 as in the aforesaid first embodiment.

In the aforesaid prior art, the offset amount in the y axis direction of a specific trunnion was fed back to the oil pressure control of all the power rollers, so other power rollers not subjected to an external disturbance were affected by vibration of the power roller that was subject to the disturbance.

According to this embodiment, this problem is avoided as an average value for all power rollers is used for the offset amount in the y axis direction. The speed change ratio calculating unit 61a, gyration angle calculating unit 61b and y axis displacement estimating unit 61c correspond to the control circuit of claim 9.

Figure 16:
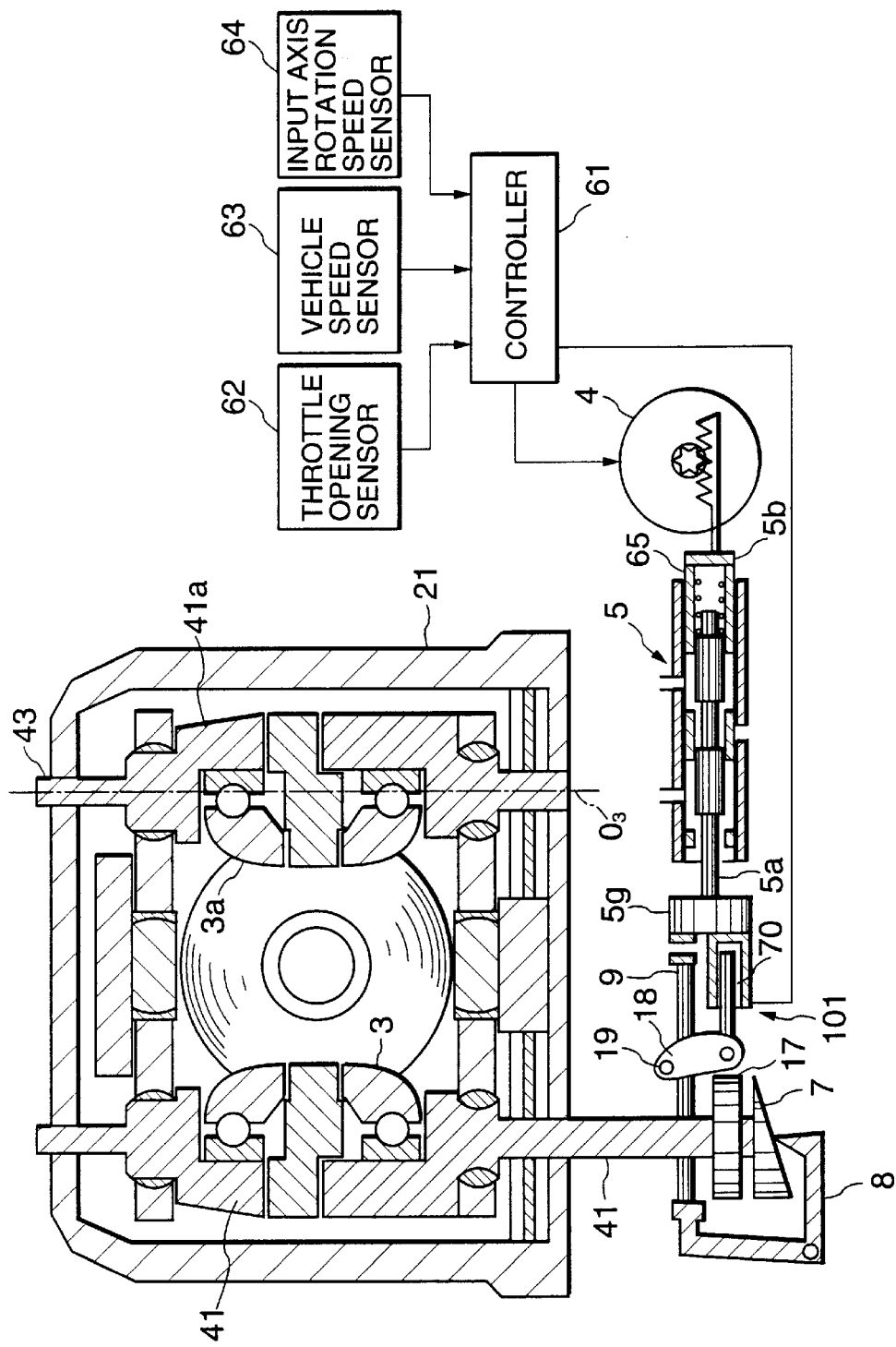
FIG. 16 is a cross-sectional view containing a block diagram of a control system of a toroidal type continuously variable transmission according to a twelfth embodiment of this invention.
Figure 17:
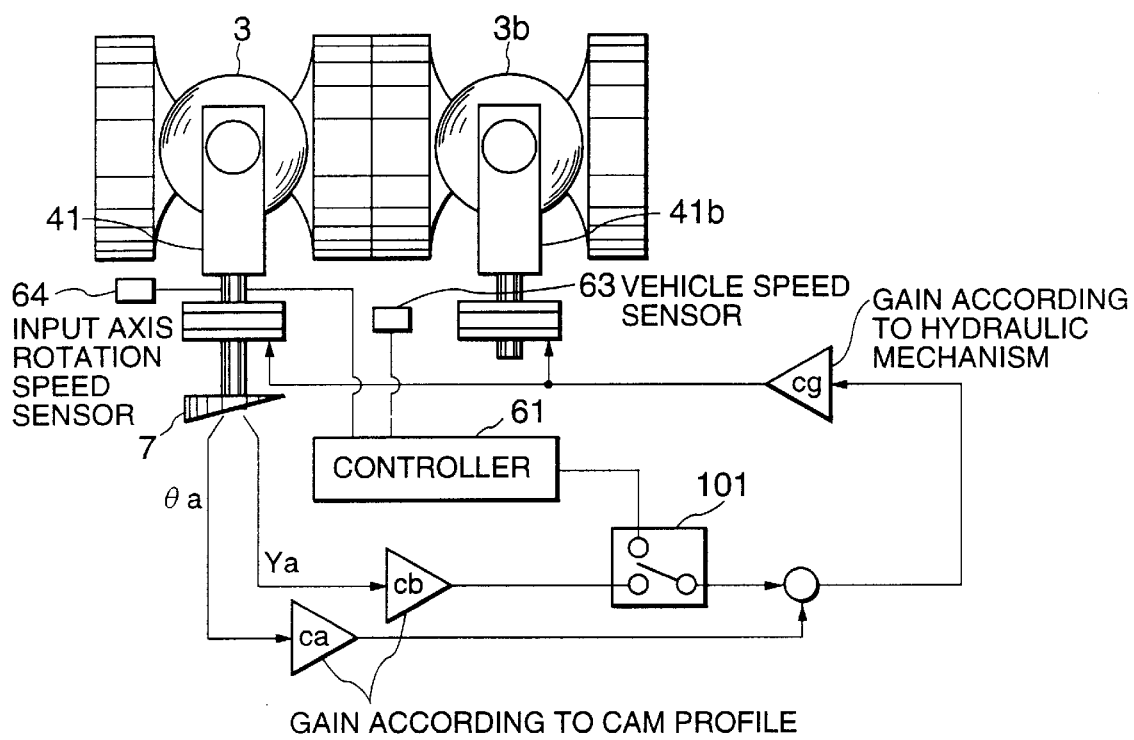
FIG. 17 is a block diagram graphically expressing speed change control according to the twelfth embodiment.

FIGS. 16 and 17 show a twelfth embodiment of this invention.

According to this embodiment, as in the aforesaid prior art example Tokkai Hei 3-89066, the specified trunnion 41 comprises a precess cam 7 which feeds back the sum of the gyration angle θa and the offset amount y in the y axis direction of the power roller 3 to the control valve 5.

The cam 17 which feeds back only the gyration angle θa of the power roller 3 to the control valve 5 is also provided in parallel with the precess cam 7.

A feedback change-over mechanism 101 is also provided to selectively apply these feedback mechanisms.

The feedback change-over mechanism 101 comprise an actuator 70 and the link 18. The actuator 70 is attached to one edge 5g of the spool 5a. The upper and lower ends of the link 18 are respectively supported by the rotation axis 19 and the actuator 70, and the link 18 is in contact with the cam 17.

A rod 9 disposed parallel to the spool 5a is connected to a link 8 which moves in synchronism with the precess cam 7. One end of this rod 9 is disposed in a relative position to the edge 5g of the spool 5, and the spool 5a is pushed towards the end of the rod 9 by a spring 65.

When the actuator 70 contracts according to a command from the controller 61, the edge 5g of the spool 5 comes in contact with the rod 9 due to the pushing force of the spring 65, and the cam 17 and link 18 separate. In this state, the displacement of the rod 9 which moves according to the motion of the precess cam 7 via the link 8 is transmitted to the spool 5a.

When the actuator 70 expands, the link 18 comes in contact with the cam 17, and the rod 9 and end 5g separate. In this state, the displacement of the cam 17 is transmitted to the spool 5a via the actuator 70.

In this way, a state wherein only the gyration angle θa of the power roller 3 is fed back to oil pressure control and a state wherein both the gyration angle θa and the offset amount y are fed back to oil pressure control, may be selected as desired according to the expansion and contraction of the actuator 70. The feedback change-over mechanism 101 corresponds to the change-over mechanism of claim 10.

According to this embodiment, under usual conditions, only the gyration angle θa of the power roller 3 is mechanically fed back, and electronic feedback of the offset amount y is performed as in the aforesaid eleventh embodiment.

If supply of current to the controller 61 is interrupted due to a vehicle battery failure, the actuator 70 contracts, the spool 5a which is pushed by the spring 65 is pressed against the rod 9 connected to the precess cam 7, and the link 18 which slides on the cam 17 separates from it, hence the motion of the precess cam 7 is transmitted to the spool 5a. In this way, both the gyration angle θa and the offset amount y are mechanically fed back. In this state, it is difficult to prevent the aforesaid synchronism collapse vibration, but as the gyration angle θa and offset amount y are fed back to oil pressure control as in the aforesaid prior art example Tokkai Hei 3-89066, fail-safe operation of speed change control is ensured even if the controller 61 breaks down. Also, when the controller 61 is operating, vibration of a specified power roller due to an external disturbance is prevented from affecting other power rollers by the same electronic feedback as that of the aforesaid eleventh embodiment.

Figure 18:
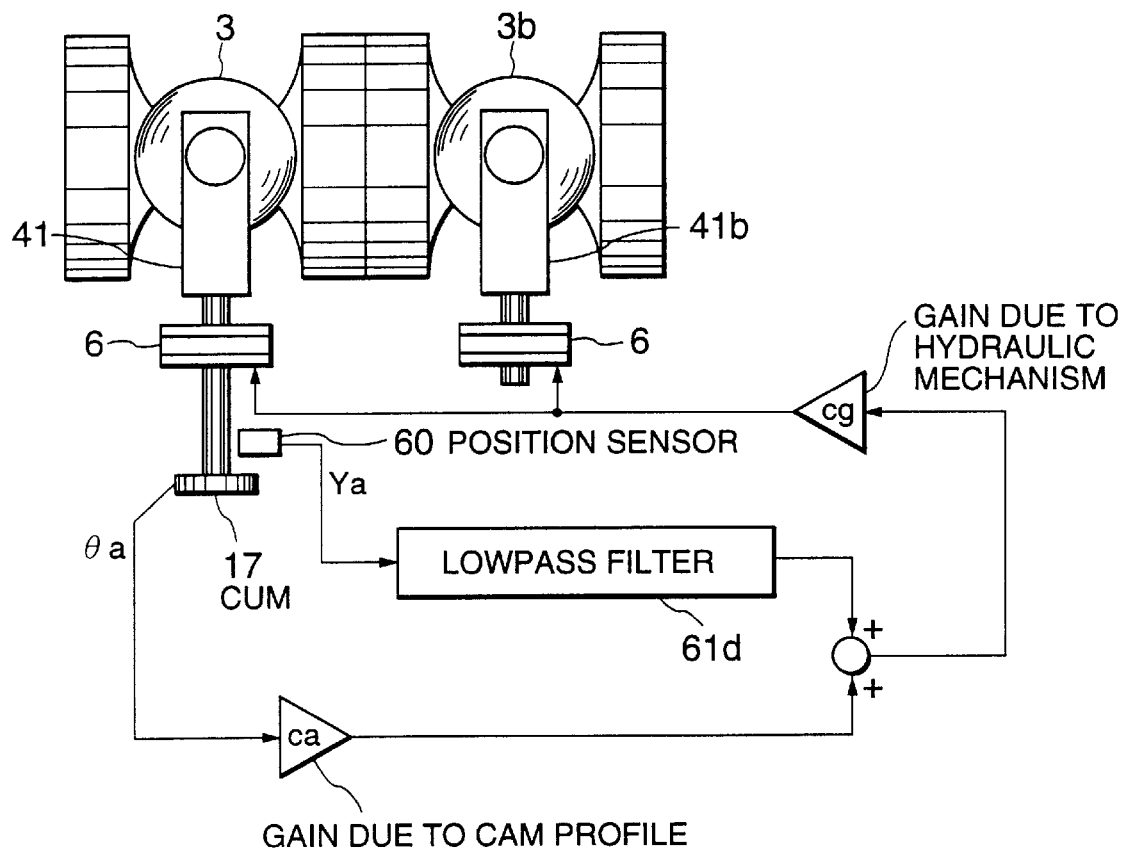
FIG. 18 is similar to FIG. 17, but showing a thirteenth embodiment of this invention.

FIG. 18 show a thirteenth embodiment of this invention.

According to this embodiment, a y axis displacement sensor 60 is provided instead of the y axis displacement estimating unit 61c of the eleventh embodiment, and a low pass filter 61d is further provided in the controller 61.

The y axis displacement sensor 60 corresponds to a sensor in claim 11.

The y axis displacement sensor 60 may for example comprise a displacement sensor using a variation of electrostatic capacitance. The offset amount in the y axis direction of the trunnion 41 is detected from the displacement of the trunnion 41 relative to the casing 21, and input to the controller 61. The controller 61 processes this input signal by the low pass filter 61d.

The low pass filter 61d is a RC filter circuit comprising a condenser and resistor, and it has the function of attenuating frequency signal components tending to cause synchronism collapse vibration, i.e. the phenomenon whereby vibration of a specified power roller due to an external disturbance causes vibration of other power rollers. A bandwidth filter having the same frequency attenuation characteristics as those of the low pass filter 61d may of course be used.

The controller 61 applies a predetermined gain to the signal processed by the low pass filter 61d.

The value obtained by the above process is then added to the command value u corresponding to the target speed change ratio, and output to the stepping motor 4. The controller 61 corresponds to the control circuit of claim 11.

Figure 19:
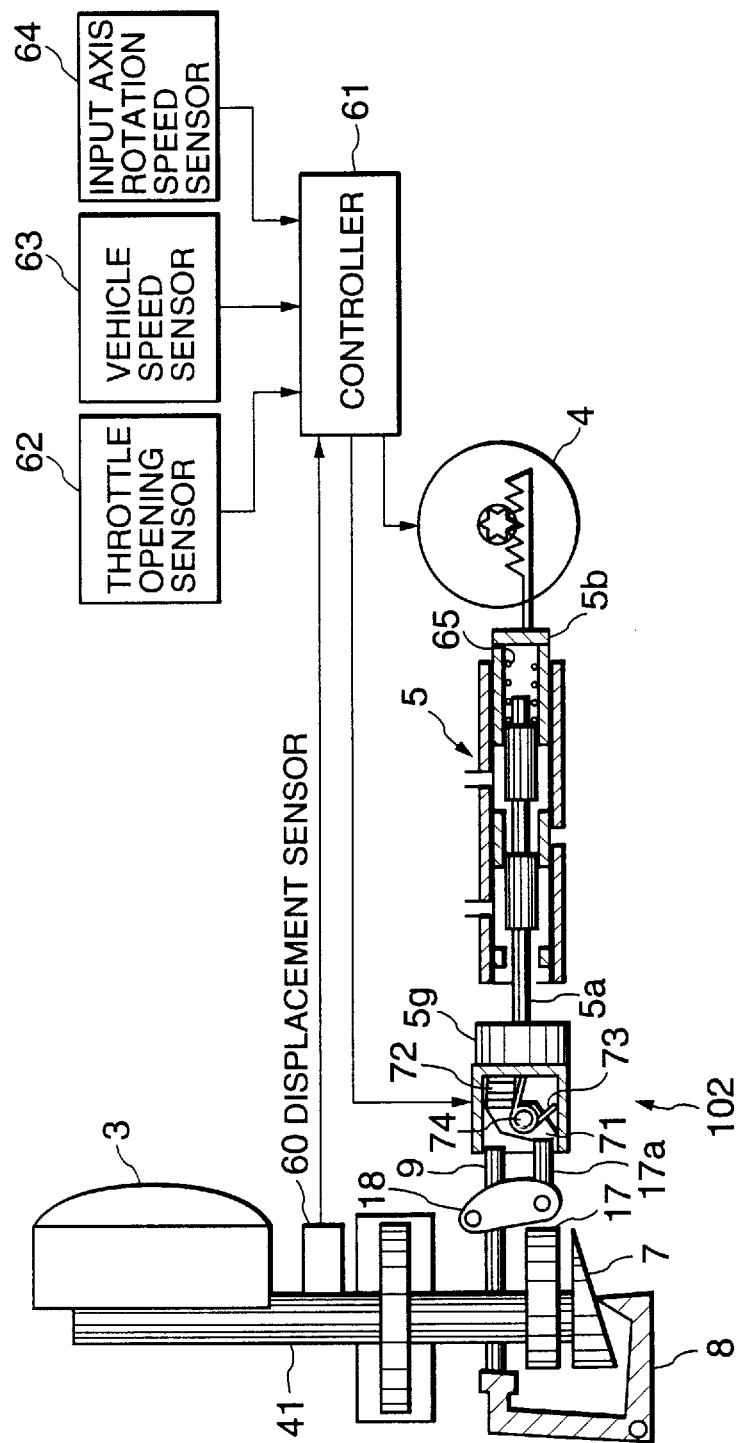
FIG. 19 is a longitudinal sectional view of a drive mechanism of a trunnion containing a block diagram of a control system thereof according to a fourteenth embodiment of this invention.

FIG. 19 shows a fourteenth embodiment of this invention.

The transmission according to this embodiment is provided with the construction of the thirteenth embodiment and a second feedback mechanism similar to that of the twelfth embodiment comprising a precess cam 7 and cam 17, spring 65, rod 9 and link 18.

A feedback change-over mechanism 102 is provided to change over these feedback mechanisms. The feedback change-over mechanism 102 comprises a change-over cam 71 supported free to pivot on a cam shaft 74 at the edge 5g of the spool 5a, a solenoid 72 which drives this change-over cam 71, and a restoring spring 73 which pushes the change-over cam 71 in a direction so that it is in contact with the rod 9. The change-over mechanism 102 corresponds to the change-over mechanism of claim 12.

The change-over cam 71 selectively comes in contact with the rod 9 connected to the link 8 and a rod 17a connected to the link 18 according to its swing position. The swing position of the change-over cam 71 is changed over by energizing and deenergizing the solenoid 72.

Change-over of the cam 71 is performed based on the result of a determination by the controller 61 as to whether or not there is synchronism collapse from a signal output by the y axis displacement sensor 60.

When the controller 61 determines from the signal output by the y axis displacement sensor 60 that synchronism has not collapsed, the solenoid 72 is not magnetized. In this case, the change-over cam 71 pushed by the restoring spring 73 comes in contact with the rod 9, and oil pressure control is performed as in the aforesaid prior art example Tokkai Hei 3-89066 based on the gyration angle θa and offset amount y by the precess cam 7. In this case, the input signal from the y axis displacement sensor 60 is not used as a feedback signal.

On the other hand when synchronism collapse is detected from the signal output by the y axis displacement sensor 60, the controller 61 magnetizes the solenoid 72.

The precess cam 71 is therefore attracted to the solenoid 72 against the force of the restoring spring 73, the cam 7 pivots about the cam shaft 74 as center and comes in contact with the rod 1 7a. In this way, only the gyration angle θa of the power roller 3 is fed back to the spool 5a, and at the same time, the controller 61 adds an input signal from the y axis displacement sensor 60 which has been processed by the low pass filter 61d to the command signal u as a feedback signal.

This input signal is fed back after removing frequency components which would cause synchronism collapse, so even when the power roller 3 suffers a displacement or vibration due to an external disturbance, its effect does not appear in the output signal from the controller 61, and it is therefore not propagated to the other power rollers.

Figure 20:
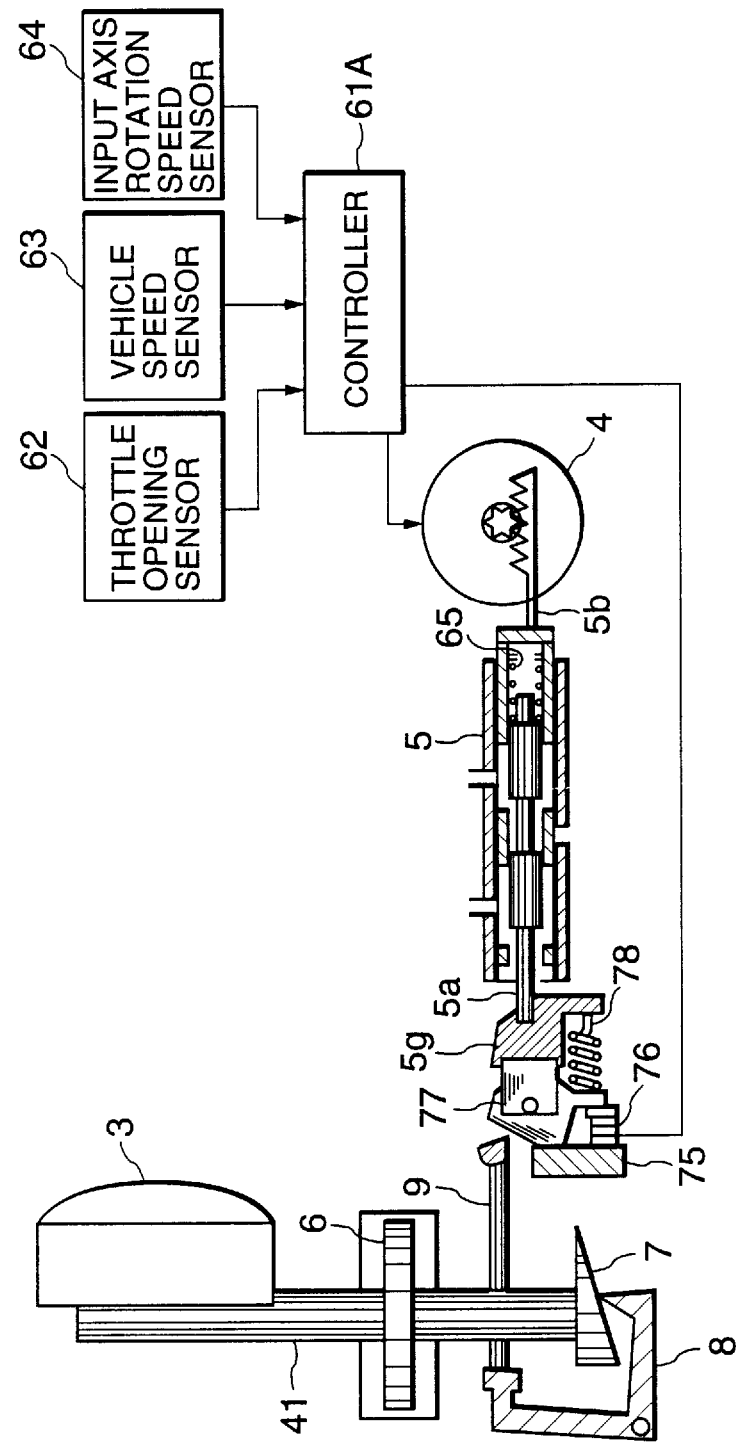
FIG. 20 is similar to FIG. 19, but showing a fifteenth embodiment of this invention.

FIG. 20 shows a fifteenth embodiment of this invention.

Herein, the cam 17 of the fourteenth embodiment is not used, and the precess cam 7 and a fixed wall 75 are selectively brought in contact with the spool 5a. For this purpose, a solenoid 76, restoring spring 78 and change-over member 77 are attached to the edge 5f of the spool 5. The restoring spring 78 is an extension spring, and a controller 61A similar to the controller 61 of the eleventh embodiment is provided. However, the controller 61A feeds back both an average offset amount and an average gyration angle to the command value u which is output to the stepping motor 4.

If the controller 61A breaks down due to a fault in the power supply, energization of the solenoid 76 is interrupted, and the change-over member 77 which is pushed by the spring 78 rotates in the anticlockwise direction of the figure so as to come in contact with the rod 9. As a result the motion of the precess cam 7 is fed back to the spool 5a, and the feedback in the y axis direction is changed over from an amount generated by an electronic device to a mechanical feedback. This provides a fail-safe mechanism.

The controller 61A of this embodiment corresponds to the control circuit of claim 14, and the fixed wall 75, solenoid 76, restoring spring 78 and change-over member 77 correspond to the change-over mechanism of claim 14.

Figure 21:
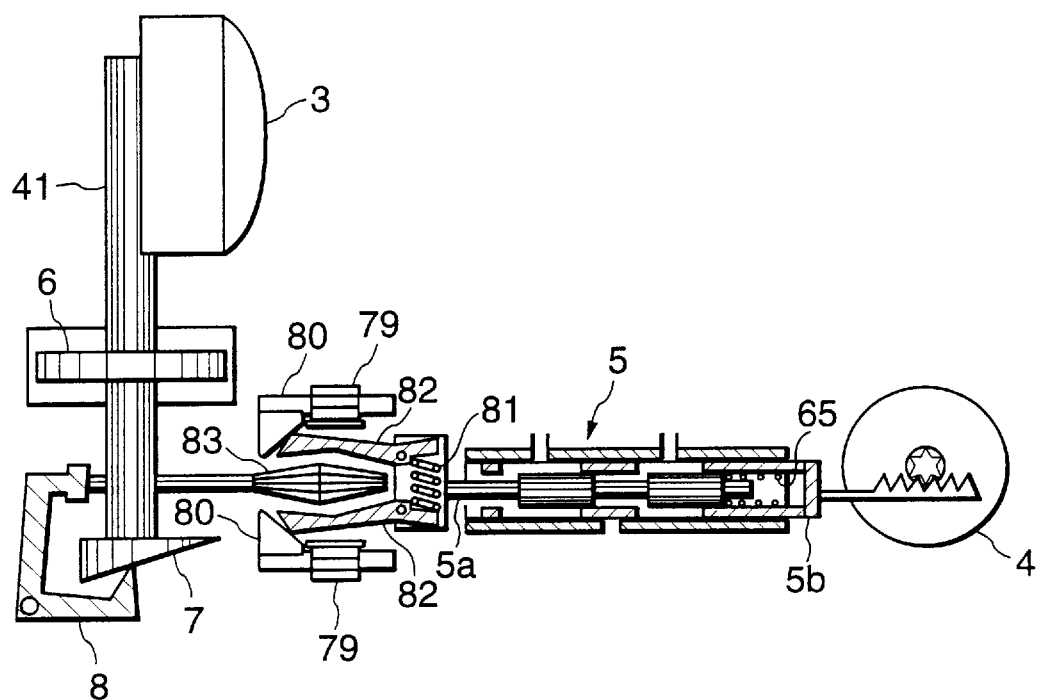
FIG. 21 is similar to FIG. 20, but showing a sixteenth embodiment of this invention.

FIG. 21 shows a sixteenth embodiment of this invention.

According to this embodiment, instead of the actuator of the fifteenth embodiment, a gripping member 82 which grips a connecting member 83 connected to the link 8, and a solenoid 79 which opens and closes the gripping member 82, are provided. The gripping member 82 is pushed by a spring 81 in such a direction that it grips the connecting member 83, and when the electromagnetic 79 is not magnetized, the connecting member 83 is gripped by the gripping member 82. Oil pressure control comprising the gyration angle θa and offset amount y in the y axis direction as feedback parameters, is thus performed by the precess cam 7.

When the solenoid 79 is energized, the gripping member 82 is attracted by the solenoid 79 against the force of the spring 81, and the gripping member 82 is held in contact with a fixed wall 80 which is formed in a one-piece construction with the casing of the transmission.

The spool 5a is therefore blocked from the precess cam 7, and oil pressure feedback control is performed based on the electronic feedback of the similar controller of the fourteenth embodiment.

The embodiments of this invention in which an exclusive property or privilege is claimed are defined as follows:

1. A toroidal type continuously variable transmission comprising a first power roller and second power roller gripped between an input disc and output disc disposed on an identical rotation axis, each of the power rollers being supported by a trunnion so as to be free to gyrate, wherein gyration angles of the power rollers are varied by driving the trunnions in a direction perpendicular to said rotation axis by a common drive force provided by an actuator, said transmission further comprising:

a mechanism for controlling said drive force such that said gyration angles are equal to a predetermined target gyration angle, a first feedback member for feeding back the gyration angle of the first power roller to a control of said drive force by said control mechanism, and a second feedback member for exerting a force depending on a displacement of said first power roller in a perpendicular direction to said rotation axis, on only the trunnion supporting said first power roller.

2. A toroidal type continuously variable transmission as defined in claim 1, wherein said second feedback member comprises a spring.

3. A toroidal type continuously variable transmission as defined in claim 1, wherein said second feedback member comprises a combination of magnets.

4. A toroidal type continuously variable transmission as defined in claim 1, wherein said second feedback member comprises an elastic resin.

5. A toroidal type continuously variable transmission as defined in claim 1, further comprising a third feedback member which exerts a force depending on a displacement of said second power roller in a perpendicular direction to said rotation axis, on only the trunnion supporting the second power roller.

6. A toroidal type continuously variable transmission comprising a first power roller and second power roller gripped between an input disc and output disc disposed on an identical rotation axis, each of the power rollers being supported by a trunnion so as to be free to gyrate, wherein gyration angles of the power rollers are varied by driving the trunnions in a direction perpendicular to said rotation axis by a common drive force provided by an actuator, said transmission further comprising:

a mechanism for controlling said drive force such that said gyration angles are equal to a predetermined target gyration angle, a feedback member for feeding back the gyration angle and a displacement of said first power roller in a perpendicular direction to said rotation axis, to a control of said drive force by said control mechanism, and a feedback member for feeding back a force depending on a displacement of said second power roller in the perpendicular direction to said rotation axis, to only the trunnion supporting the second power roller.

7. A toroidal type continuously variable transmission comprising a first power roller and second power roller gripped between an input disc and output disc disposed on an identical rotation axis, a first trunnion supporting the first power roller so as to be free to gyrate, a first drive device for varying a gyration angle of the first power roller by driving the first trunnion in a perpendicular direction to said rotation axis, a second trunnion supporting the second power roller so as to be free to gyrate, and a second drive device for varying a gyration angle of the second power roller by driving the second trunnion in the perpendicular direction to said rotation axis, said transmission further comprising:

a first control mechanism for controlling a drive force of said first drive device such that a gyration angle of the first power roller is equal to a target gyration angle, a feedback member for feeding back the gyration angle and a displacement of said first power roller in a direction perpendicular to said rotation axis, to a control of said drive force by said first control mechanism, a second control mechanism for controlling a drive force of said second drive device to said target gyration angle, and a feedback member for feeding back the gyration angle of said first power roller to a control of said drive force by said second control mechanism.

8. A toroidal type continuously variable transmission comprising a first power roller and second power roller gripped between an input disc and output disc disposed on an identical rotation axis, a first trunnion supporting the first power roller so as to be free to gyrate, and a second trunnion supporting the second power roller so as to be free to gyrate, said transmission further comprising:

a first oil chamber for varying a gyration angle of the first power roller by exerting an oil pressure on said first trunnion in a perpendicular direction to said rotation axis, a second oil chamber for varying a gyration angle of the second power roller by exerting an oil pressure on said second trunnion in a perpendicular direction to said rotation axis, a mechanism for controlling the oil pressure of said first and second oil chambers such that the gyration angles of the power rollers are equal to a predetermined target gyration angle, a member for feeding back the gyration angle of the first power roller to a control of said oil pressure by said control mechanism, and a member exerting a propelling force on said first trunnion according to a variation rate of the gyration angle of the first power roller by rotating inside said first oil chamber together with said first trunnion.

9. A toroidal type continuously variable transmission comprising a first power roller and second power roller gripped between an input disc and output disc disposed on an identical rotation axis, each of the power rollers being supported by a trunnion so as to be free to gyrate, wherein gyration angles of the power rollers are varied by driving the trunnions in a direction perpendicular to said rotation axis by a common drive force provided by an actuator, said transmission further comprising:

a mechanism for controlling said drive force such that said gyration angles are equal to a predetermined target gyration angle, said mechanism comprising a first feedback member for feeding back the gyration angle of the first power roller to a control of said drive force, a sensor for detecting a rotation speed of said input disc, a sensor for detecting a rotation speed of said output disc, and a control circuit configured to:
calculate a speed change ratio of the transmission from the rotation speeds of said input disc and output disc,
calculate an average gyration angle of said power rollers from said speed change ratio,
estimate an average value of a displacement amount in a direction perpendicular to said rotation axis of said trunnions from the variation of the average gyration angle, and
feed back said average value to the control of said drive force by said control mechanism.

10. A toroidal type continuously variable transmission as defined in claim 9, wherein said control mechanism further comprises a second member for feeding back the gyration angle and the displacement of said first power roller in the direction perpendicular to said rotation axis, to the control of said drive force and a mechanism for changing over between feedback by the first member and feedback by the second member according to an operating state of said control circuit.

11. A toroidal type continuously variable transmission comprising a first power roller and second power roller gripped between an input disc and output disc disposed on an identical rotation axis, each of the power rollers being supported by a trunnion so as to be free to gyrate, wherein gyration angles of the power rollers are varied by driving the trunnions in a direction perpendicular to said rotation axis by a common drive force provided by an actuator, said transmission further comprising:

a mechanism for controlling said drive force such that said gyration angles are equal to a predetermined target gyration angle, said mechanism comprising a first feedback member for feeding back the gyration angle of the first power roller to a control of said drive force by said control mechanism, a sensor for detecting a displacement of said first power roller in the perpendicular direction to said rotation axis, and a control circuit configured to:
eliminate predetermined high frequency components from an output signal of the sensor, and
feed back the output signal from which high frequency components have been removed, to the control of the drive force by said control mechanism.

12. A toroidal type continuously variable transmission as defined in claim 11, wherein said control mechanism further comprises a second member for feeding back the gyration angle and the displacement of said first power roller in the direction perpendicular to said rotation axis, to control of the drive force by said control mechanism and a mechanism for changing over between feedback by the first member and feedback by the second member according to an operating state of said control circuit.

13. A toroidal type continuously variable transmission comprising a first power roller and second power roller gripped between an input disc and output disc disposed on an identical rotation axis, each of the power rollers being supported by a trunnion so as to be free to gyrate, wherein the trunnions are connected with each other by a link and wherein gyration angles of the power rollers are varied by driving the trunnions in a direction perpendicular to said rotation axis by a common drive force provided by an actuator, said transmission further comprising:

a mechanism for controlling said drive force such that said gyration angles are equal to a predetermined target gyration angle, a first feedback member for feeding back the gyration angle of the first power roller to a control of the drive force by said control mechanism, and a feedback member for exerting a force opposing a displacement of the link accompanying the displacement of said first and second power rollers in a direction perpendicular to said rotation axis, on the link.

14. A toroidal type continuously variable transmission comprising a first power roller and second power roller gripped between an input disc and output disc disposed on an identical rotation axis, each of the power rollers being supported by a trunnion so as to be free to gyrate, wherein gyration angles of the power rollers are varied by driving the trunnions in a direction perpendicular to said rotation axis by a common drive force provided by an actuator, said transmission further comprising:

a sensor for detecting a rotation speed of said input disc, a sensor for detecting a rotation speed of said output disc, and a control circuit configured to:
calculate a speed change ratio of the transmission from the rotation speeds of said input disc and output disc,
calculate an average gyration angle of said power rollers from said speed change ratio,
estimate an average value of a displacement amount of said trunnions in the direction perpendicular to said rotation axis from a variation of the average gyration angle, and
feed back said average value and said average gyration angle to a control of the driving force by said control mechanism.

* * * * *